(12) United States Patent
Corbett et al.

(10) Patent No.: US 7,577,692 B1
(45) Date of Patent: Aug. 18, 2009

(54) SYSTEM AND METHOD FOR RESERVING SPACE TO GUARANTEE FILE WRITABILITY IN A FILE SYSTEM SUPPORTING PERSISTENT CONSISTENCY POINT IMAGES

(75) Inventors: Peter F. Corbett, Lexington, MA (US); Cheryl Thompson, Sunnyvale, CA (US); Robert M. English, Menlo Park, CA (US); Jeffrey L. Heller, Menlo Park, CA (US)

(73) Assignee: NetApp, Inc., Sunnyvale, CA (US)

( * ) Notice: Subject to any disclaimer, the term of this patent is extended or adjusted under 35 U.S.C. 154(b) by 306 days.

(21) Appl. No.: 10/423,391

(22) Filed: Apr. 25, 2003

(51) Int. Cl.
*G06F 17/30* (2006.01)
(52) U.S. Cl. ...................... 707/205; 707/204
(58) Field of Classification Search ................ 707/205, 707/1, 204, 203; 711/4, 203, 154, 133
See application file for complete search history.

(56) References Cited

U.S. PATENT DOCUMENTS

| | | | |
|---|---|---|---|
| 4,570,217 A | 2/1986 | Allen et al. | |
| 5,121,479 A * | 6/1992 | O'Brien | 710/34 |
| 5,163,131 A | 11/1992 | Row et al. | |
| 5,202,979 A | 4/1993 | Hillis et al. | |
| 5,278,979 A | 1/1994 | Foster et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,948,110 A | 9/1999 | Hitz et al. | |
| 5,950,225 A | 9/1999 | Kleiman | |
| 5,963,962 A | 10/1999 | Hitz et al. | |
| 6,038,570 A | 3/2000 | Hitz et al. | |
| 6,065,037 A | 5/2000 | Hitz et al. | |
| 6,138,126 A | 10/2000 | Hitz et al. | |
| 6,289,356 B1 | 9/2001 | Hitz et al. | |
| 6,425,035 B2 | 7/2002 | Hoese et al. | |
| 6,640,233 B1 * | 10/2003 | Lewis et al. | 707/205 |
| 6,883,083 B1 * | 4/2005 | Kemkar | 711/203 |
| 2003/0018604 A1 * | 1/2003 | Franz et al. | 707/1 |
| 2003/0023815 A1 * | 1/2003 | Yoneyama et al. | 711/133 |
| 2003/0159007 A1 * | 8/2003 | Sawdon et al. | 711/154 |
| 2003/0187887 A1 * | 10/2003 | Beal | 707/204 |
| 2003/0221077 A1 * | 11/2003 | Ohno et al. | 711/165 |
| 2004/0030822 A1 * | 2/2004 | Rajan et al. | 711/4 |

(Continued)

OTHER PUBLICATIONS

HP 9000 Systems (hereinafter "HP doc") (Hewlett-Packard, HPJFS 3.3 and HP OnLineJFS 3.3 VERITAS File System 3.3 System Administrator's Guide for HP-UX 11.00 and HP-UX 11i, Nov. 2000).*

(Continued)

*Primary Examiner*—John E Breene
*Assistant Examiner*—Dennis Myint
(74) *Attorney, Agent, or Firm*—Cesari and McKenna, LLP

(57) ABSTRACT

The present invention provides a system and method for reserving space to guarantee file writability in a file system supporting PCPIs. An administrator of a storage system implants a set of space reservation policies to ensure that clients of the storage system do not receive an out of space error in response to overwriting a section of a particular file.

32 Claims, 12 Drawing Sheets

U.S. PATENT DOCUMENTS

2004/0068636 A1* 4/2004 Jacobson et al. ............ 711/203
2004/0250033 A1* 12/2004 Prahlad et al. ............... 711/162

OTHER PUBLICATIONS

Hitz et al., "File System Design for an NFS File Server Appliance", USENIX Winter 1994, [online] Mar. 1995 [Retrieved on Mar. 16, 2009]. Retrieved from Internet: <URL: https:www.usenix.org/publications/library/proceedings/sf94/full_papers/hitz.a>.*
Thekkath et al., "Frangipani: A Scalable Distributed File System", ACM 1997, [online] Oct. 1997 [Retrieved on Mar. 16, 2009]. Retrieved from Internet: <URL: http://portal.acm.org/ft_gateway.cfm?id=266694&type=pdf&coll=GUIDE&dl=GUIDE&CFID=26928085&CFTOKEN=54521353>.*
Santry et al., "Deciding when to Forget in the Elephant File System", ACM 1999 [online], Dec. 1999 [Retrieved on Mar. 16, 2009]. Retrieved from Internet: <URL: http://portal.acm.org/fy_gateway.cfm?id=319159&type=pdf&coll=GUIDE&dl=GUIDE&CFID=26928213&CFTOKEN=12680906>.*
Kaashoek et al., "The Logical Disk: A New Approach to Improving File Systems", ACM 1993 [online], Dec. 1993 [Retrieved on Mar. 16, 2009]. Retrieved from Internet: <URL: http://portal.acm.org/ft_gateway.cfm?id=168621&type=pdf&coll=GUIDE&dl=GUIDE&CFID=26928354&CFTOKEN=73360823>.*
U.S. Appl. No. 10/100,945, Stephen L. Manley et al.
U.S. Appl. No. 10/216,453, Vijayan Rajan et al.
David Hitz et al. TR3002 File System Design for a NFS File Server Appliance published by Network Appliance, Inc.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.
Howard, John H., *An Overview of the Andrew File System*, Carnegie Mellon University, CMU-ITC-88-062 1988.
Howard, John, H. et al., *Scale and Performance in a Distributed File System*, ACM Trans. Computer System, 6(1), Feb. 1988 pp. 51-81.
Kazar, Michael Leon, *Synchronization and Caching Issues in the Andrew File System*, Carnegie Mellon University, CMU-ITC-88-063.
Kazar, Michael L., et al., *DEcorum File System Architectural Overview*, USENIX Summer Conference, Anaheim, California, 1990.
Kemper, Alfons, et al., *Performance Tuning for SAP R/3*, Data Engineering Journal 22, Feb. 1999 pp. 33-40.
Kent, Jack et al., *Optimizing Shadow Recovery Algorithms, IEEE Transactions on Software Engineering*, 14( 2): 155-168, Feb. 1988.
Kistler, et al., *Disconnected Operation in the Coda File System*, ACM Transactions on Computer Systems, vol. 10, No. 1, Feb. 1992, pp. 3-25.
Lorie, Raymond, A. *Physical Integrity in a Large Segmented Database*, ACM Trans. Database Syst., vol. 2, Mar. 1977, pp. 91-104.
Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.
Patterson, D., et al., *A Case for Redundant Arrays of Inexpensive Disks (RAID)*, Technical Report, CSD-87-391, Computer Science Division, Electrical Engineering and Computer Sciences, University of California at Berkeley 1987.
Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17):3:109-16 Sep. 1988.
Peterson, Zachary Nathaniel Joseph, *Data Placement for Copy-on-Write Using Virtual Contiguity*, University of CA, Santa Cruz, Master's Thesis for the Department of Science in Computer Science, Sep. 2002.
Quinlan, Sean, *A Cached WORM File System*, Software-Practice and Experience, 21(12):1289-1299 1991.
Rosenblum, Mendel, et al., *The LFS Storage Manager*, Computer Science Division, Electrical Engineering And Computer Sciences, Univ. of CA, presented at Summer '90 USENIX Technical Conference, Anaheim, CA Jun. 1990.
Rosenblum, Mendel, et al., *The Design and Implementation of a Log-Structured System* Jul. 24, 1991 pp. 1-15.
Rosenblum, Mendel, *The Design and Implementation of a Log-Structured File System*, 1992 pp. 1-93.
Rosenblum, Mendel, et al., *The Design and Implementation of a Log-Structured File System*, In Proceedings of ACM Transactions on Computer Systems, (10)1:26-52, Feb. 1992.
Schiefer, Berni, et al., *DB2 Universal Database Performance Tuning*, Data Engineering Journal 22, Feb. 1999, pp. 12-19.
Seltzer, Margo I., et al., *Journaling Versus Soft Updates: Asynchronous Meta-Data Protection in File Systems*, Proceedings of 200 USENIX Annual Technical Conference, Jun. 18-23, 2000.
Shasha, Dennis, *Tuning Time Series Queries in Finance: Case Studies and Recommendations*, Data Engineering Journal 22, Feb. 1999 pp. 41-47.
Sidebotham, Bob, *Volumes: The Andrew File System Data Structuring Primitive*, EEUG Conference Proceedings, Manchester, UK, Autumn 1986.
Subramanian, Muralidhar, et al., *Performance Challenges in Object-Relational DBMSs*, Data Engineering Journal 22, Feb. 1999 pp. 28-32.
Weikum, Gerhard, et al., *Towards Self-Tuning Memory Management for Data Servers*, Data Engineering Journal 22, Feb. 1999 pp. 3-11.
West, Michael, et al. *The ITC Distributed File System: Prototype and Experience*, Carnegie-Mellon University, Technical Report CMU-ITC-040, Mar. 1985.
Zayas, Edward R., AFS-3 Programmer's Reference: Architectural Overview, Transarc Corporation, Pittsburgh, PA, 1.0 edition 1991.

* cited by examiner

US 7,577,692 B1

SYSTEM AND METHOD FOR RESERVING SPACE TO GUARANTEE FILE WRITABILITY IN A FILE SYSTEM SUPPORTING PERSISTENT CONSISTENCY POINT IMAGES

FIELD OF THE INVENTION

The present invention relates to storage systems and, in particular, to reserving space on a storage system to ensure that files may be overwritten in a file system supporting persistent consistency point images.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored. As used herein a file is defined to be any logical storage container that contains a fixed or variable amount of data storage space, and that may be allocated storage out of a larger pool of available data storage space. As such, the term file, as used herein, and unless the context otherwise dictates can also mean a container, object or any other storage entity that does not correspond directly to a set of fixed data storage devices. A file system is, generally, a computer system for managing such files, including the allocation of fixed storage space to store files on a temporal or permanent basis.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems, Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (lun).

Some known file systems contain the capability to generate a snapshot of the file system. In the example of a WAFL-based file system, snapshots are described in TR3002 File System Design for a NFS File Server Appliance by David Hitz, et al., published by Network Appliance, Inc. and in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al., which are hereby incorporated by reference.

"Snapshot" is a trademark of Network Appliance, Inc. It is used for purposes of this patent to designate a persistent consistency point (CP) image. A persistent consistency point image (PCPI) is a point-in-time representation of the storage system, and more particularly, of the active file system, stored on a storage device (e.g., on disk) or in other persistent memory and having a name or other identifier that distinguishes it from other PCPIs taken at other points in time. A PCPI can also include other information (metadata) about the active file system at the particular point in time for which the image is taken. The terms "PCPI" and "snapshot" shall be used interchangeably throughout this patent without derogation of Network Appliance's trademark rights.

In the example of the Write Anywhere File Layout (WAFL™) file system, by Network Appliance, Inc., of Sunnyvale, Calif., a file is represented as an inode data structure adapted for storage on disks. FIG. 1 is a schematic block diagram illustrating an exemplary on-disk inode 100, which preferably includes a meta data section 110 and a data section 150. The information stored in the meta data section 110 of each inode 100 describes a file and, as such, includes the type (e.g., regular or directory) 112 of the file, the size 114 of a file, time stamps (e.g., accessed and/or modification) 116 for the file and ownership, i.e., user identifier (UID 118) and group identifier (GID 120), of the file. The meta data section 110 further includes a xinode field 130 containing a pointer 140 that references another on-disk inode structure containing, e.g., access control list (ACL) information associated with the file or directory. The contents of the data section 150 of each inode may be interpreted differently depending upon the type of file (inode) defined within the type field 112. For example, the data section 150 of a directory inode contains meta data controlled by the file system, whereas the data section of a regular inode contains user-defined data. In this latter case the data section 150 includes a representation of the data associated with the file.

Specifically, the data section 150 of a regular on-disk inode may include user data or pointers, the latter referencing 4 kilobyte (KB) data block on disk used to store the user data. Each pointer is preferably a logical volume block number which thereby facilitates efficiency among a file system and/or disk storage layer of an operating system when accessing the data on disks. Given the restricted size (e.g., 128 bytes) of the inode, user data having a size that is less than or equal to 64 bytes is represented in its entirety within the data section of an inode. However if the user data is greater than 64 bytes but less than or equal to 64 kilobytes (KB), then the data section of the inode comprises up to 16 pointers, each of which references a 4 KB block of data on disk. Moreover, if the size of the data is greater than 64 KB but less than or equal to 64 megabytes (MB), then each pointer in the data section 150 of the inode references an indirect inode that contains 1024 pointers, each of which references a 4 kilobyte data block on disk.

A PCPI is a restorable version of a file system created at a predetermined point in time and stored on the same storage devices that store the file system. PCPIs are generally created on some regular user-defined schedule. The PCPI is stored on-disk along with the active file system, and is called into a buffer cache of the filer memory as requested by the storage operating system. An exemplary file system inode structure 200 is shown in FIG. 2. The inode for an inode file 205 contains information describing the inode file associated with a given file system. In this exemplary file system inode structure the inode for the inode file 205 contains a pointer to an inode file indirect block 210. The inode file indirect block 210 contains a set of pointers to inode blocks 215, each typically containing multiple inodes 217, which in turn contain pointers to indirect blocks 219. The indirect blocks 219 include pointers to file data blocks 220A, 220B and 220C. Each of the file data blocks 220(A-C) is capable of storing, in the illustrative embodiment, 4 kilobytes (KB) of data.

When the file system generates a PCPI of a given file system, a PCPI inode is generated as shown in FIG. 3. The PCPI inode 305 is, in essence, a duplicate copy of the inode for the inode file 205 of the file system 200. Thus, the exemplary file system structure 200 includes the inode file indirect blocks 210, inodes 217, indirect blocks 219 and file data blocks 220A-C as in FIG. 2. When a user modifies a file data block, the file system layer writes the new data block to disk and changes the active file system to point to the newly created block.

FIG. 4 shows an exemplary inode file system structure 400 after a file data block has been modified. In this illustrative example, file data block 220C was modified to file data block 220C'. When file data block 220C is modified to file data block 220C', the contents of the modified file data block are written to a new location on disk as a function of the exemplary WAFL file system. Because of this new location, the indirect block 419 must be rewritten. Due to this changed indirect block 419, the inode 417 must be rewritten. Similarly, the inode file indirect block 410 and the inode for the inode file 405 must be rewritten. Thus, after a file data block has been modified the PCPI inode 305 contains a pointer to the original inode file indirect block 210 which in turn contains pointers through the inode 217 and an indirect block 219 to the original file data blocks 220A, 220B and 220C. However, the newly written indirect block 419 includes pointers to unmodified file data blocks 220A and 220B. The indirect block 419 also contains a pointer to the modified file data block 220C' representing the new arrangement of the active file system. A new inode for the inode file 405 is established representing the new structure 400. Note that metadata (not shown) stored in any snapshotted blocks (e.g., 305, 210, and 220C) protects these blocks from being recycled or overwritten until they are released from all PCPIs. Thus, while the active file system inode for the inode file 405 points to new blocks 220A, 220B and 220C', the old blocks 210, 217, 219 and 220C are retained until the PCPI is fully released.

After a PCPI has been created and file data blocks modified, the file system layer can reconstruct or "restore" the file system inode structure as it existed at the time of the PCPI by accessing the PCPI inode. By following the pointers contained in the PCPI inode 305 through the inode file indirect block 210, inode 217 and indirect block 219 to the unmodified file data blocks 220A-C, the file system layer can reconstruct the file system as it existed at the time of creation of the PCPI.

Storage systems, including multi-protocol storage appliances, export virtual disks (vdisks) to clients utilizing block-based protocols, such as, for example, Fibre Channel and iSCSI. One example of a vdisk is a special file type in a volume that derives from a plain file, but that has associated export controls and operation restrictions that support emulation of a disk. Vdisks are described further in U.S. patent application Ser. No. 10/216,453, entitled STORAGE VIRTUALIZATION BY LAYERING VIRTUAL DISK OBJECTS ON A FILE SYSTEM, by Vijayan Rajan, et al., the contents of which are hereby incorporated by reference. These block-based protocols and the exported file/vdisks appear as physical disk devices to the clients of the storage system. A well-known feature of disk devices is that they do not return no space errors, hereinafter referred to as an OUTOFSPACE error, when a write operation is directed to a space that is known to exist. It should be noted, as one skilled in the art would recognize, that the exact error returned is protocol specific. As such, the term OUTOFSPACE error should be taken to mean generally a protocol specific out of space error. In other words, disk devices will not return an OUTOFSPACE error when a previously written block on disk is being rewritten. This is because the completion of a successful write of the block establishes to the application that the data storage for the block exists. The application then assumes and depends on the continued existence of the storage going forward, and does not expect to receive an error when subsequently writing this storage. If a disk device does return an OUTOFSPACE error, clients, which typically are not expecting or programmed to respond to such errors, will typically fail or suffer from an error condition. This client failure may lead to the loss of data integrity and/or data loss. This noted problem may be generalized to other types of files. For example, a database management system assumes that once it has written successfully to an area of a file it may continue to re-write to that area of the file without receiving an OUTOFSPACE error.

However, when using a file system supporting PCPIs, it is possible to exhaust the available disk space due to re-writing data that is stored both in the active file system and in a PCPI. It should be noted that other file system architectures, including those with differing techniques for generating PCPIs, may suffer from overcommitting space by permitting blocks of data and/or metadata to be shared among PCPIs and the active file system. As such, the teachings of the present invention may be utilized in any file system supporting PCPIs. The PCPI mechanism and file system described should be taken as exemplary only. For example, a file of size X bytes exists in the file system supporting PCPIs. Immediately after a PCPI is taken of the file, the total space consumed by the file is X plus the added space required by the PCPI root inode. As blocks are modified in the PCPI file, the size consumed by the file and its associated PCPI may approach 2× bytes. That is, as the version of the file in the active file system diverges from the version stored in the PCPI, the amount of space occupied by the file approaches 2×. If the available free space on a disk is less than 2×, it is possible that a client attempting to re-write a portion of a file may receive an OUTOFSPACE error.

Additionally, certain file systems, including the above-described WAFL file system include the ability to generate sparse files. By "sparse file" it is meant a file that is created with a set size but not all of the physical blocks associated with the file are written and/or allocated at the time of file creation. For example, using certain backup operations, a sparse file may be generated and slowly written to in background (e.g., using a conventional "lazy write" operation), thereby reducing the need for a massive data transfer from one storage device to another. In such file systems, when the file is created it consists basically of holes that need to be filled. For example, in a WAFL-based file system, the root inode and associate intermediate inodes may be created, however, the file data blocks may not be allocated within the file system. As data is written to the sparse file, file data blocks are then allocated as needed.

In such file systems that utilize sparse files, it is possible that the amount of free space in the file system may become less than that utilized or required by the filled in sparse files. In such cases, a write operation directed to a sparse file may fail with an OUTOFSPACE error. As clients are typically not programmed to deal with these errors, data loss and/or a loss of data integrity may occur.

Thus, it is desirous to have a system and method for maintaining space reservations in a file system to ensure that OUTOFSPACE errors do not occur.

SUMMARY OF THE INVENTION

The disadvantages of the prior art are overcome by providing a system and method for reserving space to guarantee file writability in a file system supporting PCPIs. The system and method provides a series of space accounting mechanisms that may be user-selected and/or modified to account for various contingencies including the mass divergence of a file in the active file system from a copy stored in a PCPI and the use of sparse files within a file system. In response to reaching a certain threshold level, the system and method will perform a series of actions as implemented by a set of policies that may be user selectable and/or adjustable. These policies may include, for example, disallowing a write operation, disallowing a PCPI from occurring, while permitting a write operation to fill any hole and/or overwrite any block already stored in a PCPI. These policies may be implemented on a volume, quota tree (qtree) and/or file level in accordance with various embodiments of the present invention. A qtree is a sub-organization in a volume's file system. Qtrees are described further in U.S. patent application Ser. No. 10/100,945, entitled SYSTEM AND METHOD FOR STORAGE OF SNAPSHOT METADATA IN A REMOTE FILE, by Stephen L. Manley, et al., the contents of which are hereby incorporated by reference.

In accordance with the illustrative embodiment of the present invention, when new file system commands that could decrease the amount of available space are received by the file system, the file system determines if the results of the command would generate a condition where the available free space has fallen below a threshold limit. If the command would result in filling a hole in a file that was previously space-reserved, the command is permitted to execute. If the command is to generate a PCPI, a determination is made whether there would be enough free space after the generation of the PCPI to completely rewrite the PCPI. If there would be enough free space to completely re-write the reserved files stored in the PCPI, then the file system will permit the PCPI to occur. Otherwise, the PCPI is denied. If the command received is a simple write operation, it would be permitted to occur if the results do not exhaust the free space available on the disk.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage Appliance

The present invention may be implemented, in the illustrative embodiment, on a multi-protocol storage appliance that serves both file and block protocol access to information stored on storage devices in an integrated manner. In this context, the integrated multi-protocol appliance denotes a computer having features such as simplicity of storage service management and ease of storage reconfiguration, including reusable storage space, for users (system administrators) and clients of network attached storage (NAS) and storage area network (SAN) deployments. The storage appliance may provide NAS services through a file system, while the same appliance provides SAN services through SAN virtualization, including logical unit number (lun) emulation.

Figure 1:
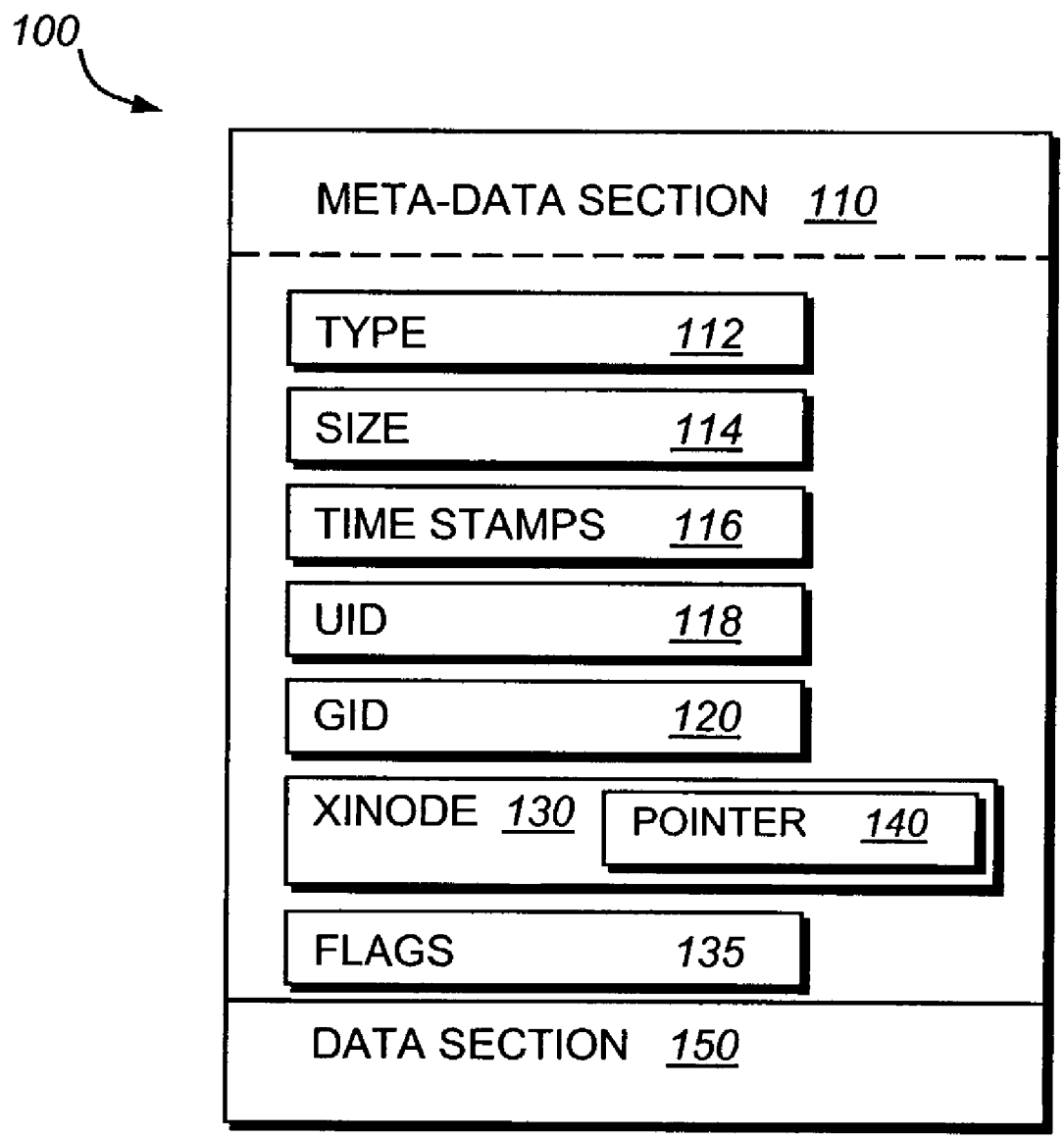
FIG. 1, already described, is a schematic block diagram of an exemplary inode data structure in accordance with an embodiment of the present invention.
Figure 2:
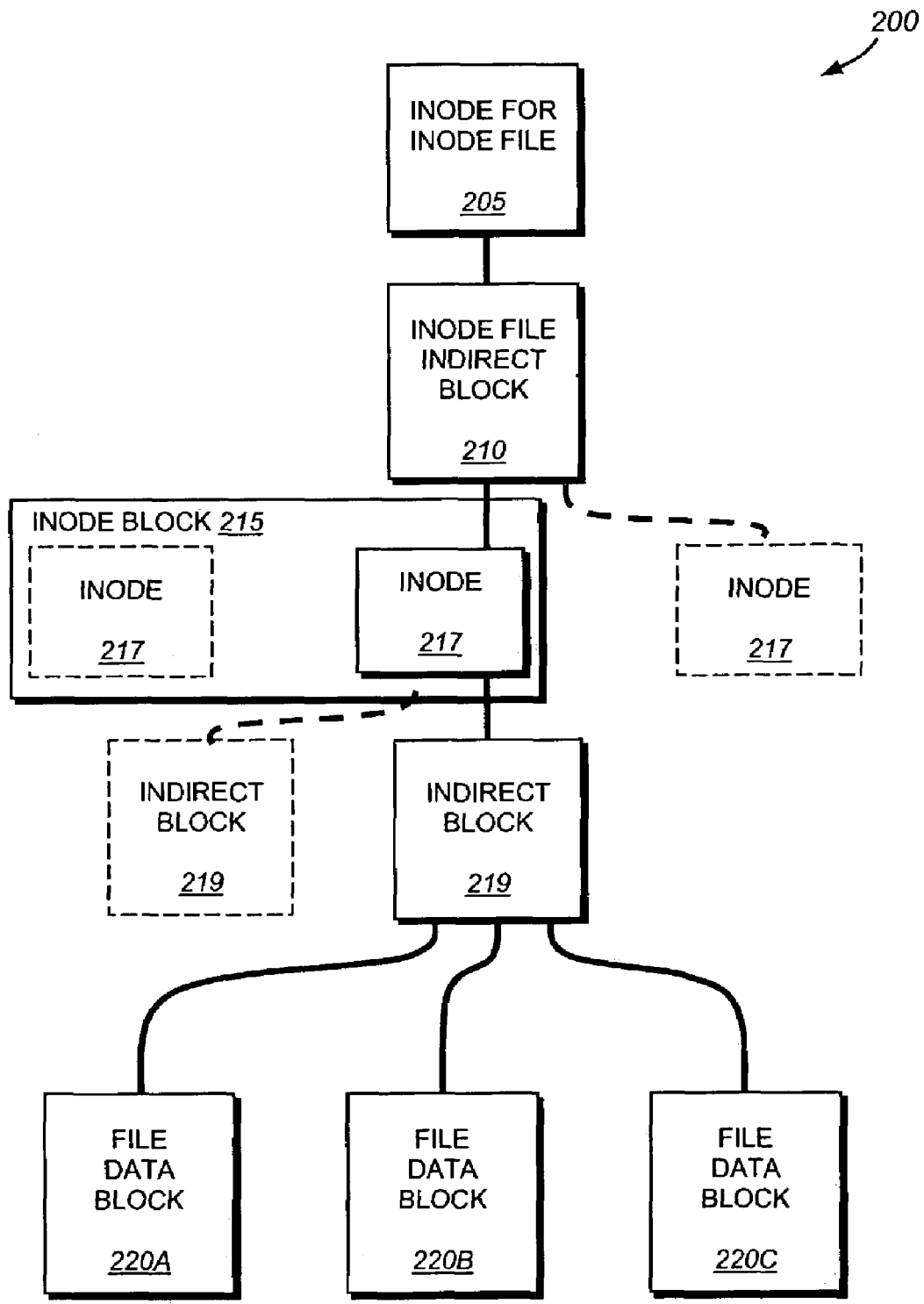
FIG. 2, already described, is a schematic block diagram of an exemplary inode data structure in accordance with an embodiment of the present invention.
Figure 3:
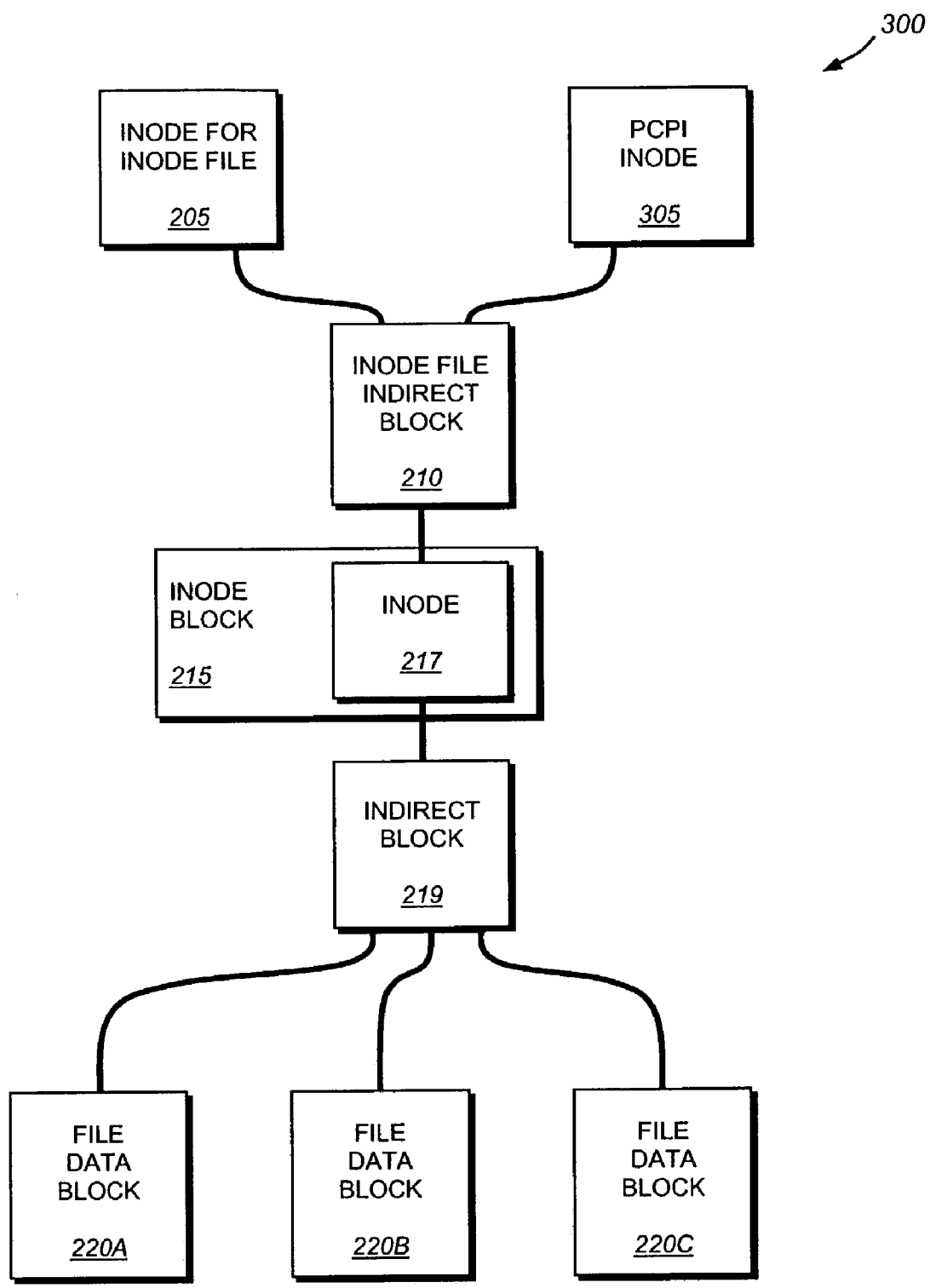
FIG. 3, already described, is a schematic block diagram of an exemplary inode data structure showing a PCPI route inode in accordance with an embodiment of the present invention.
Figure 4:
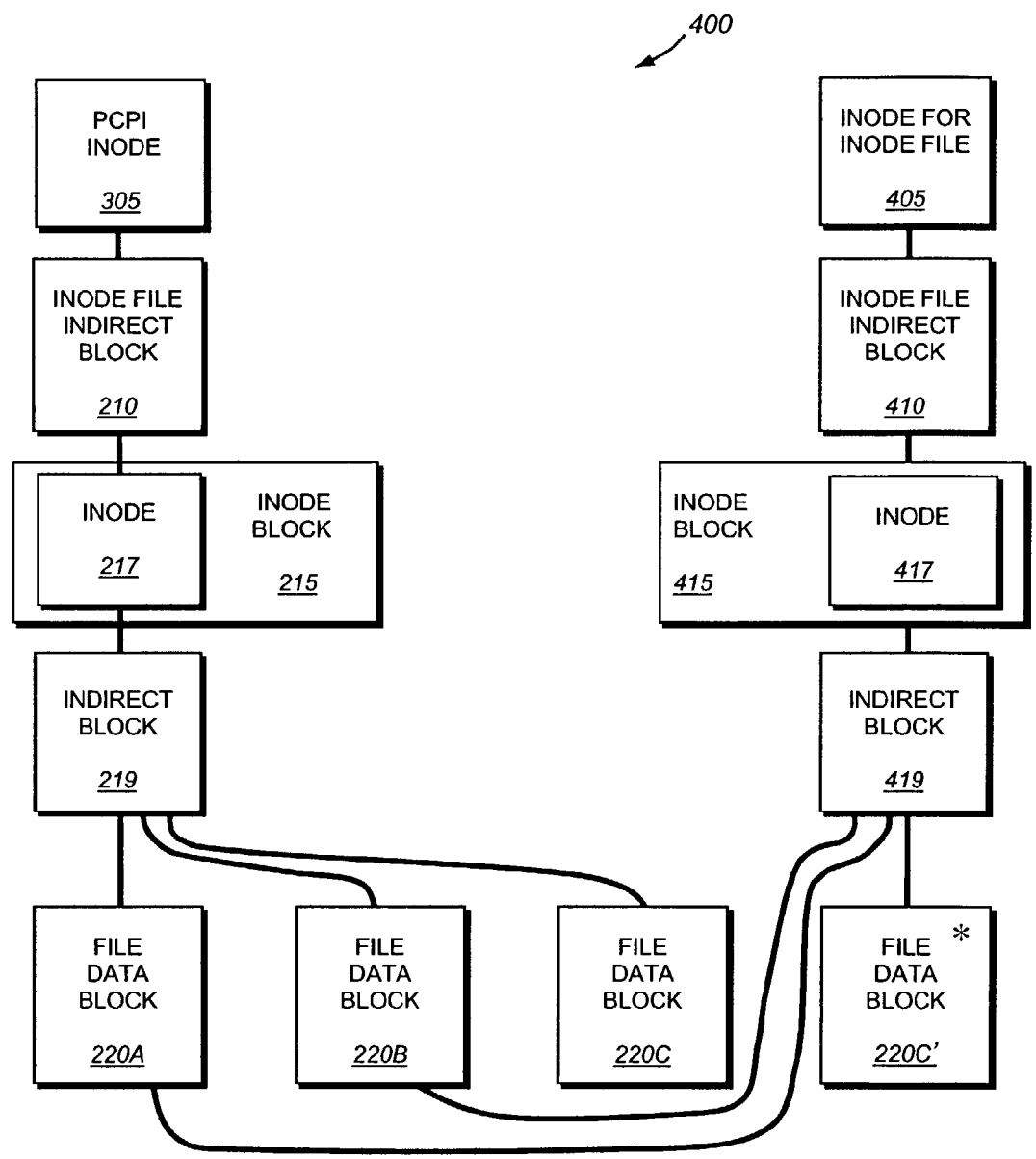
FIG. 4, already described, is a schematic block diagram of an exemplary inode data structure showing a modified file after a PCPI.
Figure 5:
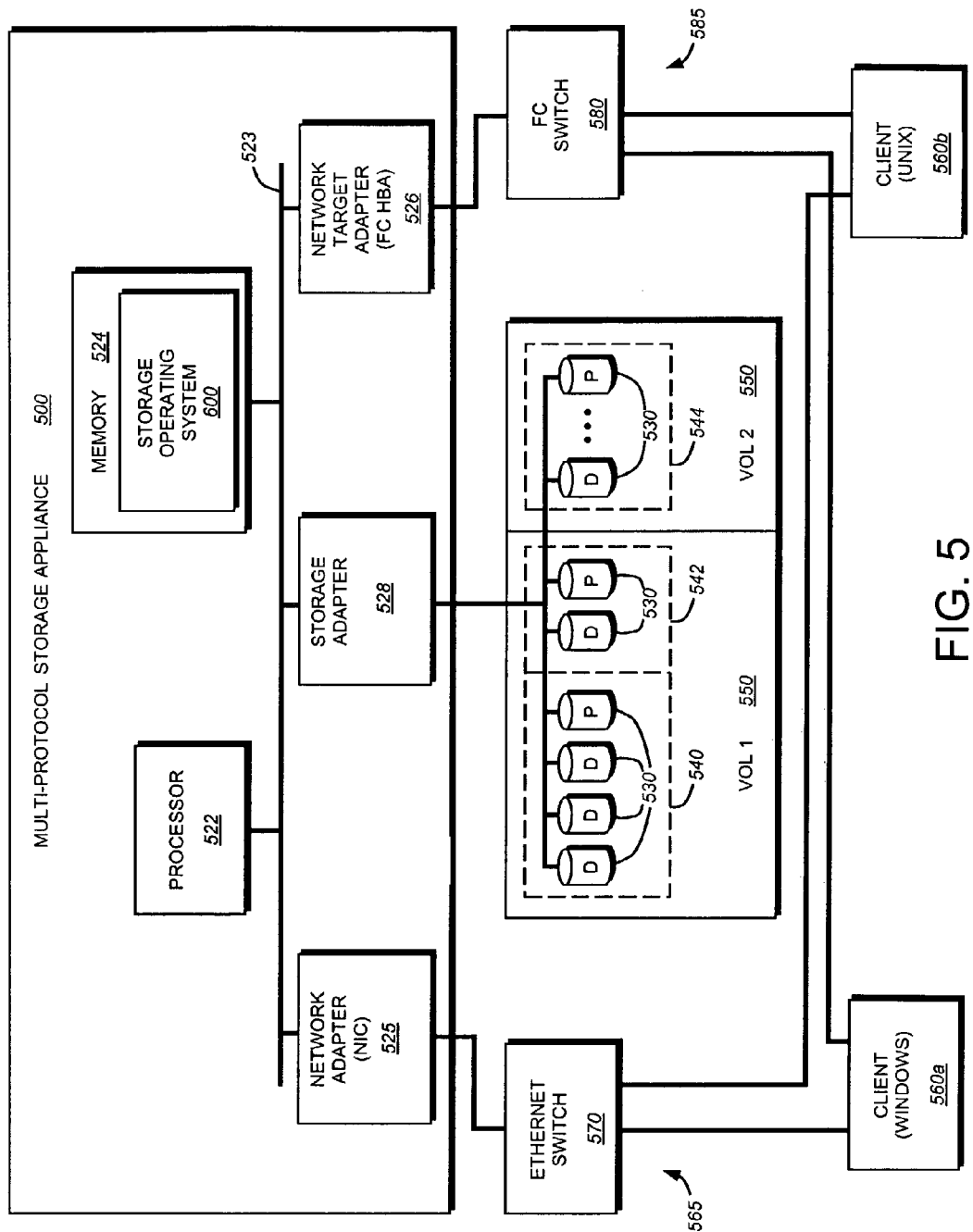
FIG. 5 is a schematic block diagram of an exemplary storage system in accordance with an embodiment of the present invention.

FIG. 5 is a schematic block diagram of the multi-protocol storage appliance 500 configured to provide storage service relating to the organization of information on storage devices, such as disks 530. The storage appliance 500 is illustratively embodied as a storage system comprising a processor 522, a memory 524, a plurality of network adapters 525, 526 and a storage adapter 528 interconnected by a system bus 523. The multi-protocol storage appliance 500 also includes a storage operating system 600 that provides a virtualization system (and, in particular, a file system) to logically organize the information as a hierarchical structure of named directory, file and virtual disk (vdisk) storage objects on the disks 530.

Whereas clients of a NAS-based network environment have a storage viewpoint of files, the clients of a SAN-based network environment have a storage viewpoint of blocks or disks. To that end, the multi-protocol storage appliance 500 presents (exports) disks to SAN clients through the creation of logical unit numbers (luns) or vdisk objects. A vdisk object (hereinafter "vdisk") is a special file type that is implemented by the virtualization system and translated into an emulated disk as viewed by the SAN clients. The multi-protocol storage appliance thereafter makes these vdisks accessible to the SAN clients through controlled exports, as described further herein.

In the illustrative embodiment, the memory 524 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 600, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapter 525 couples the storage appliance to a plurality of clients 560a,b over point-to-point links, wide area networks, virtual private networks implemented over a public network (Internet) or a shared local area network, hereinafter referred to as an illustrative Ethernet network 565. Therefore, the network adapter 525 may comprise a network interface card (NIC) having the mechanical, electrical and signaling circuitry needed to connect the appliance to a network switch, such as a conventional Ethernet switch 570. For this NAS-based network environment, the clients are configured to access information stored on the multi-protocol appliance as files. The clients 560 communicate with the storage appliance over network 565 by exchanging discrete frames or packets of data according to pre-defined protocols, such as the Transmission Control Protocol/Internet Protocol (TCP/IP).

The clients 560 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 560 may request the services of the storage appliance 500 by issuing file access protocol messages (in the form of packets) to the appliance over the network 565. For example, a client 560a running the Windows operating system may communicate with the storage appliance 500 using the Common Internet File System (CIFS) protocol over TCP/IP. On the other hand, a client 560b running the UNIX operating system may communicate with the multi-protocol appliance using either the Network File System (NFS) protocol over TCP/IP or the Direct Access File System (DAFS) protocol over a Virtual Interface (VI) transport in accordance with a remote direct memory access (RDMA) protocol over TCP/IP. It will be apparent to those skilled in the art that other clients running other types of operating systems may also communicate with the integrated multi-protocol storage appliance using other file access protocols.

The storage network "target" adapter 526 also couples the multi-protocol storage appliance 500 to clients 560 that may be further configured to access the stored information as blocks or disks. For this SAN-based network environment, the storage appliance is coupled to an illustrative Fibre Channel (FC) network 585. FC is a networking standard describing a suite of protocols and media that is primarily found in SAN deployments. The network target adapter 526 may comprise a FC host bus adapter (HBA) having the mechanical, electrical and signaling circuitry needed to connect the appliance 100 to a SAN network switch, such as a conventional FC switch 580. In addition to providing FC access, the FC HBA may offload Fibre Channel network processing operations for the storage appliance.

The clients 560 generally utilize block-based access protocols, such as the Small Computer Systems Interface (SCSI) protocol, when accessing information (in the form of blocks, disks or vdisks) over a SAN-based network. SCSI is a peripheral input/output (I/O) interface with a standard, device independent protocol that allows different peripheral devices, such as disks 530, to attach to the storage appliance 500. In SCSI terminology, clients 560 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The multi-protocol storage appliance 500 supports various SCSI-based protocols used in SAN deployments, including SCSI encapsulated over TCP (iSCSI) and SCSI encapsulated over FC (FCP). The initiators (hereinafter clients 560) may thus request the services of the target (hereinafter storage appliance 500) by issuing iSCSI and FCP messages over the network 565, 585 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

The storage adapter 528 cooperates with the storage operating system 600 executing on the storage appliance to access information requested by the clients. The information may be stored on the disks 530 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 522 (or the adapter 528 itself) prior to being forwarded over the system bus 523 to the network adapters 525, 526, where the information is formatted into packets or messages and returned to the clients.

Storage of information on the appliance 500 is preferably implemented as one or more storage volumes (e.g., VOL1-2 550) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may be used in accordance with the present invention.

Specifically, each volume 550 is constructed from an array of physical disks 530 that are organized as RAID groups 540, 542, and 544. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated for use with the teachings described herein. In the illustrative embodiment, a minimum of one parity disk and one data disk may be employed. However, a typical implementation may include three data and one parity disk per RAID group and at least one RAID group per volume.

B. Storage Operating System

To facilitate access to the disks 530, the storage operating system 600 implements a write-anywhere file system of a virtualization system that "virtualizes" the storage space provided by disks 530. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the named files and directories, while further enabling block-based (SAN) access to the named vdisks on a file-based storage platform. The file system simplifies the complexity of management of the underlying physical storage in SAN deployments.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the multi-protocol storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data, such as application data, associated with the emulated disk. The stream inode stores attributes that allow luns and exports to persist over, e.g., reboot operations, while also enabling management of the vdisk as a single disk object in relation to SAN clients. An example of a vdisk and its associated inodes that may be advantageously used with the present invention is described in co-pending and commonly assigned U.S. patent application Ser. No. 10/216,453 entitled STORAGE VIRTUALIZATION BY LAYERING VDISKS ON A FILE SYSTEM, which application is hereby incorporated by reference as though fully set forth herein.

In accordance with an illustrative embodiment of the present invention, when a vdisk is generated it is typically created as a sparse file, described further below. However, the vdisk will also reserve the appropriate amount of space to fill the holes of the newly generated vdisk. Thus, the present invention will prohibit actions from exhausting or utilizing space in the file system that would prevent the vdisk from being completely written to disk in the future.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 6:
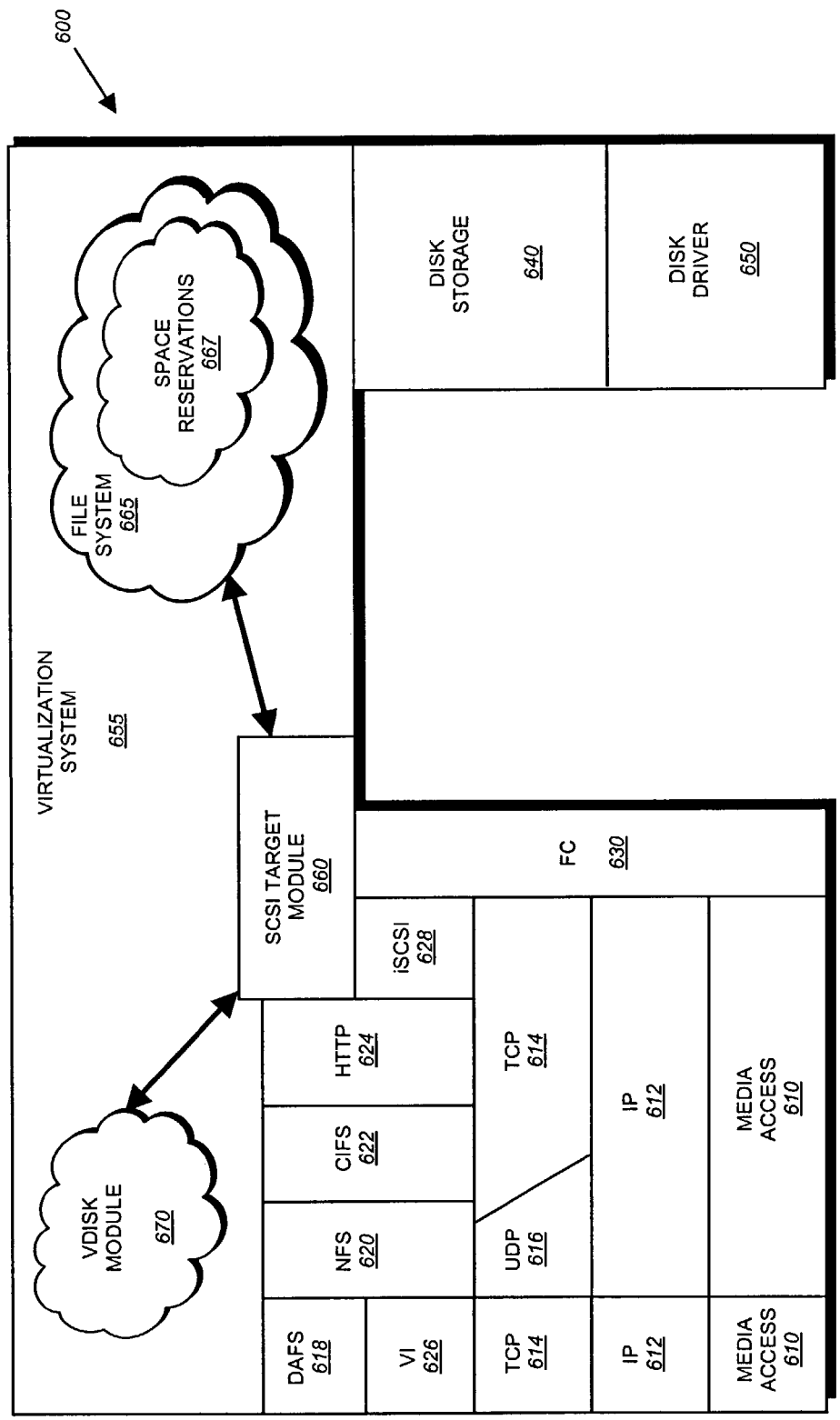
FIG. 6 is a schematic block diagram of an exemplary storage operating system for use with the storage system of FIG. 5 in accordance with an embodiment of the present invention.

FIG. 6 is a schematic block diagram of an exemplary storage operating system 600 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file-access protocols. The protocol stack includes a media access layer 610 of network drivers (e.g., gigabit Ethernet drivers) that interfaces to network protocol layers, such as the IP layer 612 and its supporting transport mechanisms, the TCP layer 614 and the User Datagram Protocol (UDP) layer 616. A file system protocol layer provides multi-protocol file access and, to that end, includes support for the DAFS protocol 618, the NFS protocol 620, the CIFS protocol 622 and the Hypertext Transfer Protocol (HTTP) protocol 624. A Virtual Interface (VI) layer 626 implements the VI architecture to provide direct access transport (DAT) capabilities, such as RDMA, as required by the DAFS protocol 618.

An iSCSI driver layer 628 provides block protocol access over the TCP/IP network protocol layers, while a FC driver layer 630 operates with the FC HBA 526 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 640 that implements a disk storage protocol, such as a RAID protocol, and a disk driver layer 650 that implements a disk access protocol such as, e.g., a SCSI protocol.

Bridging the disk software layers with the integrated network protocol stack layers is a virtualization system 655 that is implemented by a file system 665 cooperating with virtualization modules illustratively embodied as, e.g., vdisk module 670 and SCSI target module 660. It should be noted that the vdisk module 670, file system 665 and SCSI target module 660 can be implemented in software, hardware, firmware, or a combination thereof. The vdisk module 670 is layered on (and interacts with) the file system 665 to provide a data path from the block-based SCSI target module to blocks managed by the file system. In essence, the vdisk module 670 manages SAN deployments by, among other things, implementing a comprehensive set of vdisk (lun) commands issued through a user interface by a system administrator. These vdisk commands are converted to primitive file system operations ("primitives") that interact with the file system 665 and the SCSI target module 660 to implement the vdisks.

The SCSI target module 660, in turn, initiates emulation of a disk or lun by providing a mapping procedure that translates logical block access to luns specified in access requests into virtual block access to the special vdisk file types and, for responses to the requests, vdisks into luns. The SCSI target module is illustratively disposed between the FC and iSCSI drivers 528, 530 and the file system 665 to thereby provide a translation layer of the virtualization system 655 between the SAN block (lun) space and the file system space, where luns are represented as vdisks.

The file system 665 illustratively implements the above-described WAFL file system having an on-disk format representation that is block-based using, e.g., 4 kilobyte (kB) blocks and using inodes to describe the files.

Broadly stated, all inodes of the file system are organized into the inode file. A file system (FS) info block specifies the layout of information in the file system and includes an inode of a file that includes all other inodes of the file system. Each volume has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

Included with the file system 665 is a set of space reservation processes 667. The space reservation procedures or processes 667 implement, in the illustrative embodiment, the space reservation policies of the present invention.

It should be noted that the software "path" through the storage operating system layers described above needed to perform data storage access for the client request received at the multi-protocol storage appliance may alternatively be implemented in hardware. That is, in an alternate embodiment of the invention, a storage access request data path through the operating system layers (including the virtualization system 300) may be implemented as logic circuitry embodied within a field programmable gate array (FPGA) or an application specific integrated circuit (ASIC). This type of hardware implementation increases the performance of the storage service provided by appliance 500 in response to a file access or block access request issued by a client 560. Moreover, in another alternate embodiment of the invention, the processing elements of network and storage adapters 525-528 may be configured to offload some or all of the packet processing and storage access operations, respectively, from processor 522 to thereby increase the performance of the storage service provided by the multi-protocol storage appliance. It is expressly contemplated that the various processes, architectures and procedures described herein can be implemented in hardware, firmware or software.

C. Sparse Files

The exemplary WAFL file system includes the capability to generate a sparse file, wherein the file is not completely written to disk at the time of its creation. The space required for the sparse file has not yet been allocated to it. The use of sparse files is often utilized in the exemplary WAFL file system environment when, for example, a vdisk is initially generated. A user or administrator may generate a vdisk of specified size, for example, 10 gigabytes (GB). To increase system performance, the file system will not write the entire vdisk to the disks at the time of creation. Instead, the file system generates a sparse file representing the vdisk. The sparse file may then be filled in via later write operations as the vdisk is filled with data.

Figure 7:
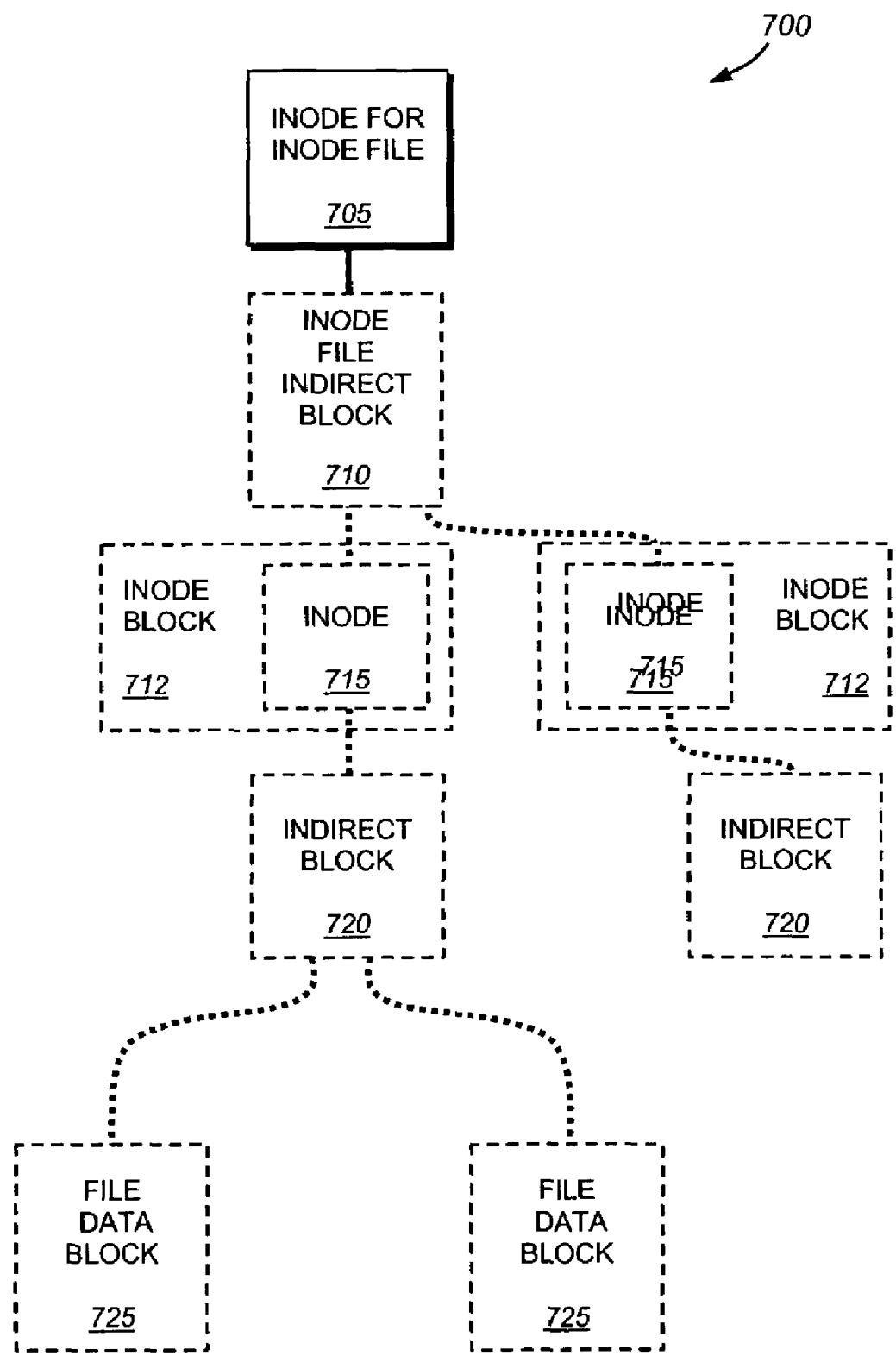
FIG. 7 is a schematic block diagram of an exemplary sparse file showing a completed inode for inode file.

FIG. 7 is a schematic block diagram of an exemplary inode structure 700 showing a sparse file. The sparse file includes an actual inode for the inode file 705, however, it does not contain an inode file indirect block 710, inode 715, indirect block 720 or file data block 725 (as shown in phantom). This exemplary inode structure 700 is created when, for example, a vdisk is initially created by the file system of a storage operation system. In typical file systems that implement sparse files, only the inode for the inode file 705 is actually written to the disk. Thus, the only physical space occupied by the file is the data block containing the inode for the inode file 705. The remainder of the size of the vdisk is not written or otherwise physically delineated on the disks storing the vdisk. Thus, the phantom blocks (i.e., 710, 715, 720 and 725) are not generated when the file is created; however, they will need to be written to disk as the sparse file is populated.

Figure 8:
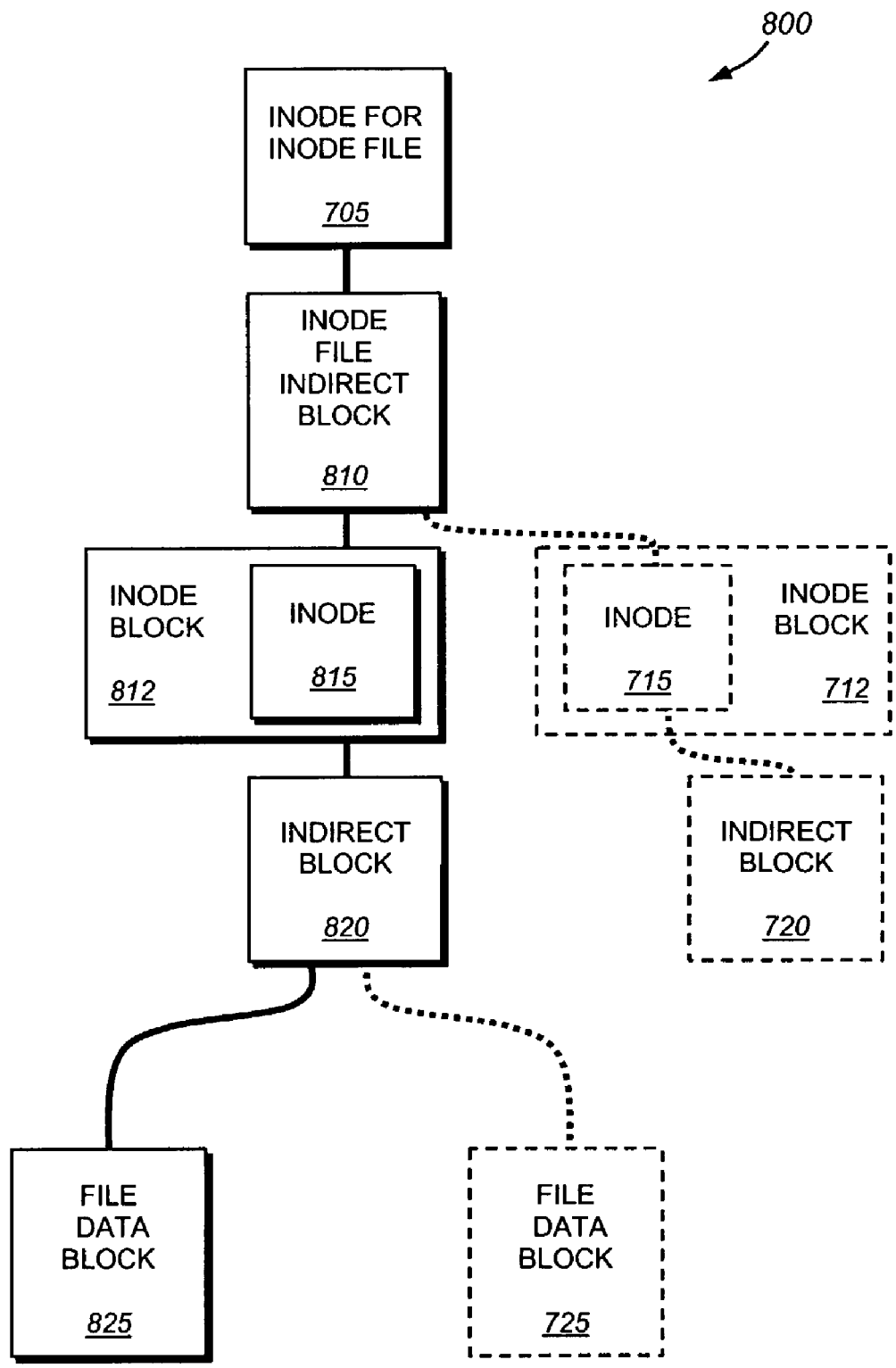
FIG. 8 is a schematic block diagram of a partially filled in sparse file in accordance with an embodiment of the present invention.
Figure 9:
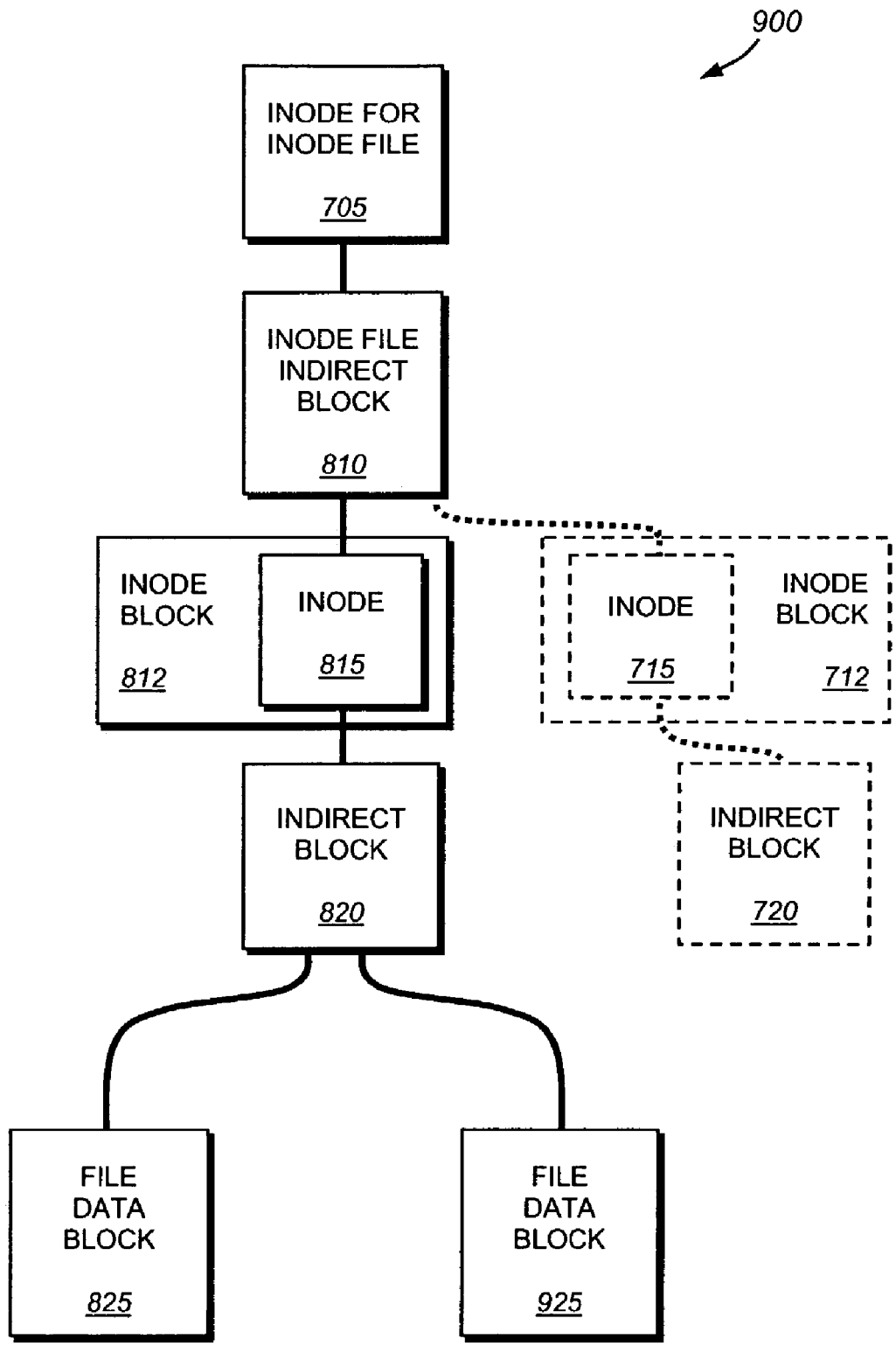
FIG. 9 is a schematic block diagram of an exemplary partially filled in sparse file in accordance with an embodiment of the present invention.
Figure 10:
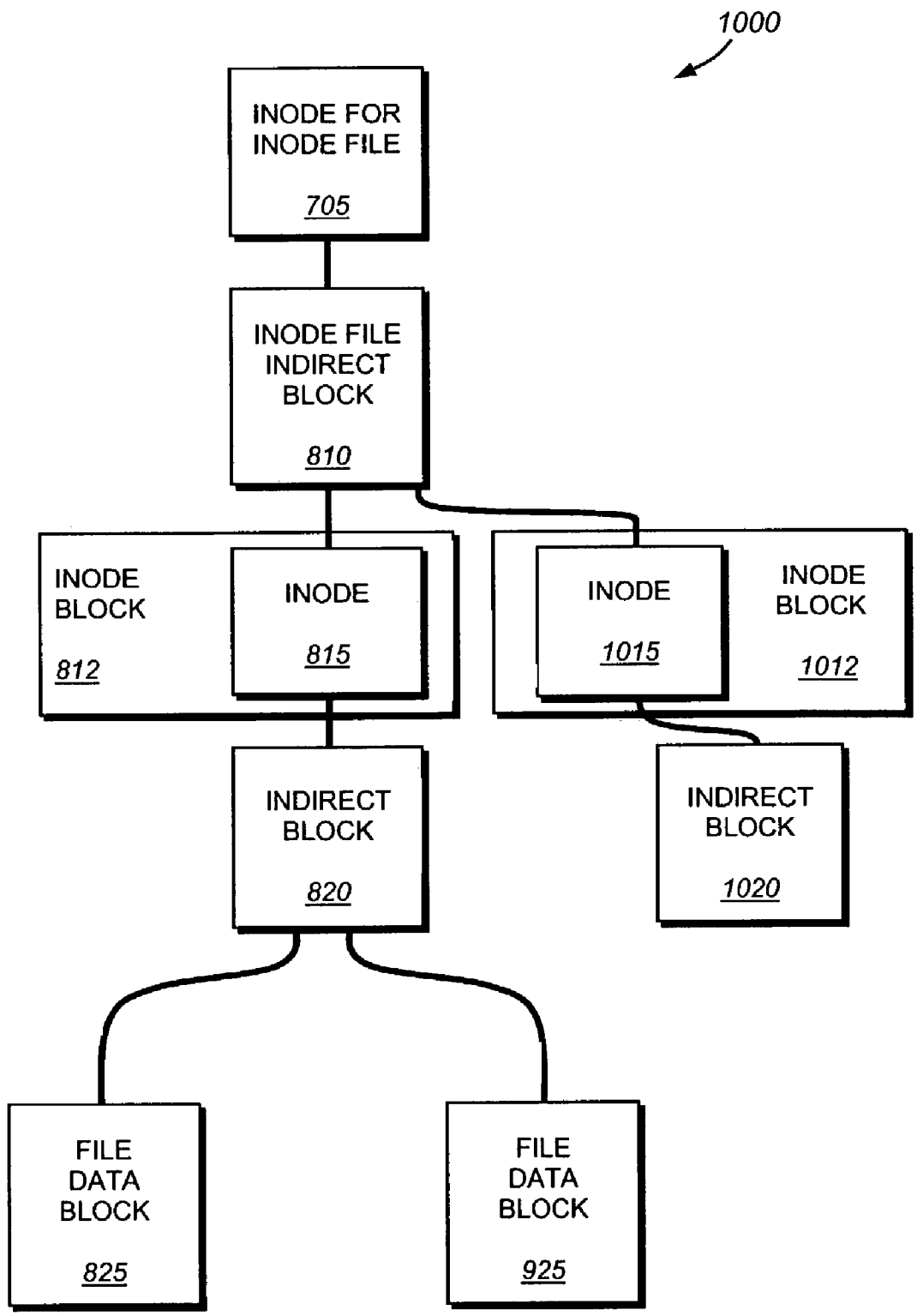
FIG. 10 is schematic block diagram of an exemplary filled in file in accordance with an embodiment of the present invention.

FIG. 8 is a schematic block diagram of an exemplary inode structure 800 of a partially filled sparse file. The sparse file includes the original inode for the inode file 705. However, the inode file and direct block 810, inode 815, indirect block 820 and exemplary file data block 825 have been filled in as write operations have occurred to the file. Continued write operations will result in filling additional file data blocks, for example, file data block 925 as shown in the exemplary inode structure 900 of FIG. 9. Eventually, when the file has been completely filled, all blocks, including such blocks as inode 1015 and indirect blocks 1020 and associated file data blocks (not shown) in the schematic block diagram of an exemplary inode structure 1000 in FIG. 10 will be completed. At such point, the sparse file has been completely filled in and each block is associated with an actual block on disk.

In prior systems, which do not include the novel space reservation system and method described herein, as the various data blocks were being written by the file system, a possibility existed that an OUTOFSPACE error could occur as the disks containing the file did not have enough space. As most file systems, applications and other programs are not configured to respond to disks losing space, error conditions and possible loss of data integrity could occur. By the use of the novel space reservation system, described further below, the possibility of receiving an unexpected OUTOFSPACE error is eliminated.

D. Space Reservations

The present invention is directed to a system and method for reserving space in a file system to guarantee the ability to write files after PCPIs and/or other file system procedures. The system and method ensures file writability by enforcing a set of policies when the available free space of a volume, disk or qtree falls below a certain threshold value. In an illustrative embodiment, not all of the files in a volume or qtree need to be reserved. Additionally, hole filling and block overwrite reservations may be independently enabled for each volume, qtree or file. Alternately, various policies may be implemented when certain file system actions including, for example, generating a PCPI of the file system, would reduce the free space to an unacceptably low level. In accordance with the illustrative embodiment of the present invention, these policies are implemented and enforced by a set of space reservation processes 667 within the file system of the storage operating system.

1. Volume Level

Figure 11:
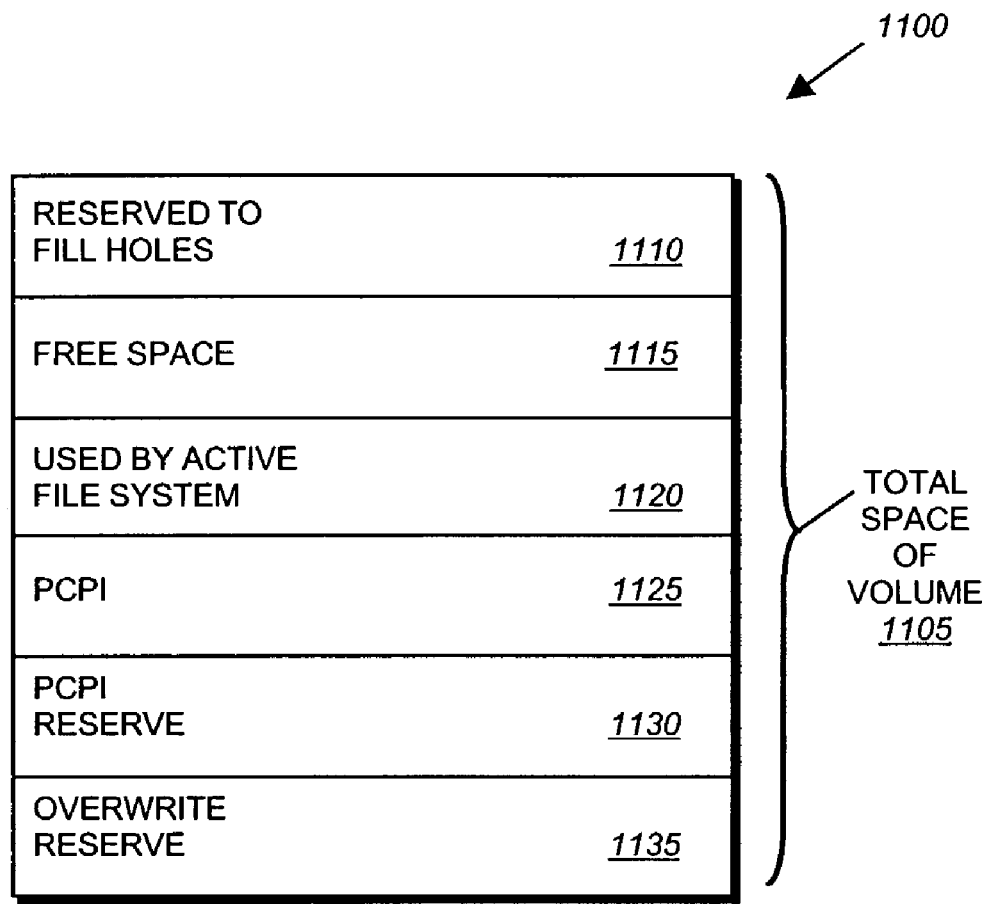
FIG. 11 is a schematic block diagram of an exemplary space reservation use table of the total space available in a total volume.

FIG. 11 is a schematic block diagram of the total space of a volume and how it may be allocated in accordance with an embodiment of the present invention. The total space of the volume 1105 is divided into six sections including, for example, a space that is reserved to fill holes in sparse files 1110, free space that may be utilized by any process 1115, the space used by the active file system 1120, space used by PCPIs 1125, a PCPI reserve 1130 and an overwrite reserve 1135.

The PCPI reserve 1130, which in the exemplary embodiment is approximately 10 percent of the volume of the total space of the volume 1105, is utilized by the file system to generate PCPIs of the active file system. The areas occupied by PCPIs 1125 include the space occupied by blocks that are currently in a PCPI but are not also in the active file system. In other words, the PCPI space 1125 consists of those blocks that have been later modified in the active file system, which requires that a copy of the unmodified block be kept for purposes of PCPI restoration. The space used by the active file system 1120 is comprised of disk blocks that are currently storing data of files accessible within the active file system (but not including PCPIs or other system configuration information). The free space 1115 is disk blocks that are unallocated to any of the other categories. The free space 1115 may be utilized to store new writes, the creation of new files, or may be utilized in the generation of a PCPI. The space reserved to fill holes 1110 is, in accordance with an embodiment of the present invention, reserved at the time of the generation of a sparse file and is equal to an amount necessary to completely fill the sparse file. The overwrite reserve 1135 is used to reserve space for blocks that are identical in both the active file system and in one or more PCPIs. When one of these blocks is overwritten in the active file system, a new block must be allocated as the original block remains allocated in the PCPI. In one embodiment of the present invention, the overwrite reserve is set to be the exact value of the number of blocks that are identical in the active file system and a PCPI. In alternate embodiments, the overwrite reserve is set to the number of blocks used by the file in the active file system.

Figure 12:
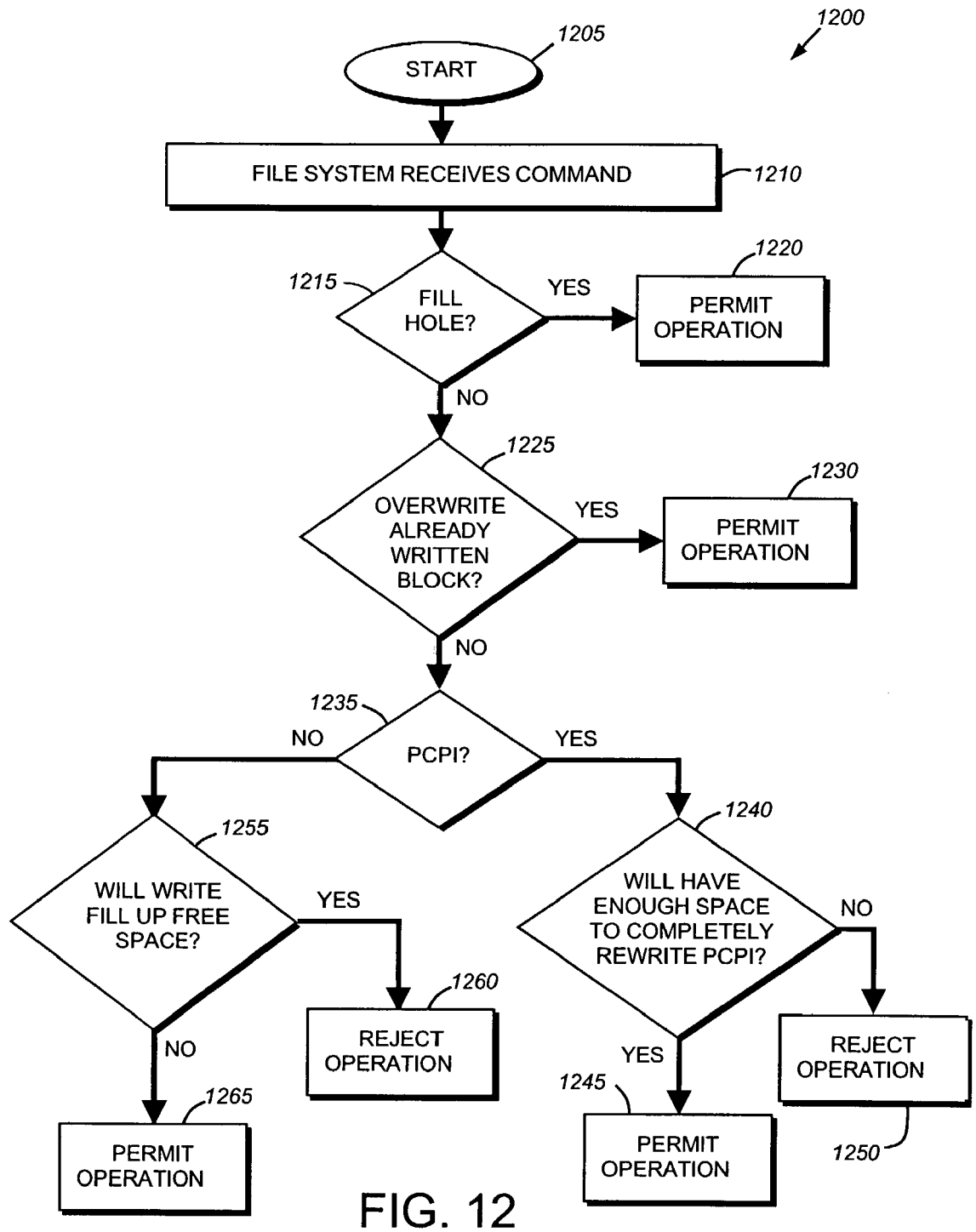
FIG. 12 is a schematic block diagram of a flow chart detailing the steps of a procedure for implementing a space reservation policy in accordance with an embodiment of the present invention.

FIG. 12 is flowchart of a procedure 1200 that implements an illustrative embodiment of the present invention. The procedure 1200 begins in step 1205 and then proceeds to step 1210 where the file system receives a command. This received command may include, for example, a write operation or a command to initiate the generation of a PCPI. The procedure then, in step 1215, determines if the received command is a write operation directed to filling a hole in a sparse file. If the command is directed to filling a hole in a sparse file, the procedure branches to step 1220 where it permits the write operation. Otherwise, the procedure continues to step 1225 where it determines if the received operation or received command is directed to overwrite an already written block in the file system. If the command is directed to overwriting an already written block, the procedure then branches to step 1230 and permits the operation to occur. Otherwise, the procedure then determines if it is a command to initiate a PCPI in step 1230.

If the received command is a command to initiate a PCPI, the procedure branches to step 1240 where it determines if the file system has enough space to completely rewrite the PCPI. If the file system has enough space to completely rewrite the PCPI, the procedure branches to step 1245 and permits the operation to occur. Otherwise, the procedure branches to 1250 and rejects the operation. If the command is not to generate a PCPI the procedure would branch from 1235 to step 1255 where it determines if the write operation would completely fill up the free space in the file system. If the write operation does not completely fill the free space, the procedure then branches to step 1265 where it permits the received operation to occur. Otherwise, the procedure rejects the operation in 1260.

2. File Level

In an alternate embodiment of the present invention, space reservations may be implemented on a file level granularity instead of a volume or qtree level. Thus, instead of ensuring that all files in a volume or qtree have appropriate space, a user or administrator may selectively activate space reservations for specific files. When implemented using file level granularity, the flags 135 field of an inode 100 associated with a file may have space reservation flags set. In the illustrative embodiment, there is a RESERVEHOLES flag that is stored in the flags field 135 of inode 100. When the RESERVE-HOLES flag is set in a particular file, the file system will, when the file is created, reserve an appropriate amount of space within the file system to fill in all of the holes of the sparse file. If the RESERVEHOLES flag is not set, the file system will not reserve the necessary space to fill in a sparse file. This may result in OUTOFSPACE errors later due to a physical lack of space on the disk devices.

Additionally, in an illustrative embodiment, the flags 135 field of an inode 100 associated with a file make have a RESERVEBLOCKS flag set. If the RESERVEBLOCKS flag is set for a particular file, the file system will reserve an appropriate amount of space in the overwrite reserve 1135 (see FIG. 11) to completely rewrite the file after a PCPI is made of the file. Thus, the RESERVEBLOCKS flag causes the file system to ensure that sufficient space is in the overwrite reserve to permit write operations to occur to the file after it a PCPI has been generated. Similarly, if the RESERVEHOLES flag is not set, the file system will not reserve the necessary overwrite reserve space. In such situations, an OUTOFSPACE error may occur due to lack of physical space on the disk devices.

To again summarize, the present invention provides a system and method for guaranteeing file writability in a file system supporting PCPIs by utilizing space reservations. The file system tracks and allocates the amount of free space available. When the file system receives certain commands that could reduce the amount of free space, e.g., a write operation or an operation to generate a PCPI, the file system determines if the requested operation will reduce the amount of free space below a user-definable threshold level.

It should be noted that, while the illustrative embodiment is described in terms of files, the teachings of the present invention may be utilized with any suitable data container. As used herein, the term data container generally refers to a unit of storage for holding data, such as a file system, disk file, volume or a logical number (LUN), which is addressable by, e.g., its own unique identification. It should also be noted that, while the illustrative embodiment is written in terms of PCPIs, the teachings of the present invention may be used to ensure file writability in any file system that shares blocks among multiple instances of the same file.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. It is thus the object of the appended claims to cover all such variations and modifications as come within the true spirit and scope of the invention.

What is claimed is:

1. A method for writing data by a file server to a disk, comprising:
   requesting the file server to execute a write command to perform a write operation to a file stored on the disk in response to a request issued by a client on a remote computer, the remote computer connected to the file server by a computer network, the file part of a file system, the disk having a space allocated for the file system, and the disk having a free space;
   if the write operation is to write the data into a portion of the persistent storage device already allocated to the computer file system but the portion is not used, then permitting the write operation;
   if the write operation is to overwrite a block already written to, permitting the write operation;
   if the file system is a sparse file system, keeping a reserve space for filling holes in the sparse file system, and if the write operation is to a hole in the sparse file system and there is enough space in the reserve for the write operation, permitting the write operation,
      if there is not enough space for the write operation in the reserve, allocating from the free space, and permitting the write operation;
   determining if the write operation is to produce a Persistent Consistency Point Image in time (PCPI);
   if the write operation is to create a PCPI, then determining if there is enough allocated space to write the PCPI to the disk,
   if there is enough allocated space to write the PCPI, permitting the write operation, and
   if there is not enough allocated space to write the PCPI, allocating from the free space, and permitting the write operation;
   if the write operation is not to create a PCPI, then,
   if the write operation will not fill up the allocated space, permitting the write operation,
   if the write operation will fill up the allocated space, allocating from the free space, and permitting the write operation;
   in the event that there is not enough free space to allocate space for the write operation, rejecting the write operation.

2. The method of claim 1, further comprising:
executing the write command in response to the write command writing data to storage blocks allocated to the file system.

3. The method of claim 1, further comprising:
executing the write command in response to there being enough free space on the disk to execute the write command.

4. The method of claim 1, further comprising:
showing by a message that an out of space error occurred.

5. The method of claim 1, further comprising:
writing a persistent consistency point in time (PCPI) of the file system by the write command.

6. The method of claim 1, further comprising:
determining if there is sufficient space to write a PCPI, and if there is not enough space to write a complete PCPI, denying the write command.

7. The method of claim 1, further comprising:
using the disk as one disk of a plurality of disks, the plurality of disks forming a Redundant Array of Independent Disks (RAID) system.

8. The method of claim 1, further comprising:
maintaining reserve space on the disk for the file system.

9. The method of claim 8, further comprising:
increasing the reserve space on the disk for the file system in response to there not being enough free space to execute the write command.

10. The method of claim 1, further comprising:
creating the file system as a sparse file system.

11. The method of claim 10, further comprising:
keeping the reserve space for filling holes of a sparse file system.

12. The method of claim 1, further comprising:
maintaining a threshold measure of free space on the disk; and
denying the write command in the event that the write command will fill the disk beyond the threshold.

13. The method of claim 1, further comprising:
calculating the free space by subtracting an amount of used space from a total space available on the disk for the file system.

14. The method of claim 1, further comprising:
accounting for a concurrent write command to the file system in determining the free space on the disk for the file system.

15. The method of claim 1, further comprising:
accounting for an intervening file create command in determining the free space on the disk for the file system.

16. A file server computer, comprising:
a port of the computer to receive a request to the file server, the request issued by a client on a remote computer, the remote computer connected to the file server by a computer network, the request to execute a write command to perform a write operation to a file stored on a disk, the file a part of a file system, the disk having a space allocated for the file system, and the disk having a free space;
an operating system executing on the computer, the operating system to execute the write command; and
an operating system to implement the following operations;
if the write operation is to write the data into a portion of the persistent storage device already allocated to the computer file system but the portion is not used, then permitting the write operation;
if the write operation is to overwrite a block already written to, permitting the write operation;
if the file system is a sparse file system, keeping a reserve space for filling holes in the sparse file system, and if the write operation is to a hole in the sparse file system and there is enough space in the reserve for the write operation, permitting the write operation,
if there is not enough space for the write operation in the reserve, increasing the reserve space from the free space, and permitting the write operation;
determining if the write operation is to produce a Persistent Consistency Point Image in time (PCPI);
if the write operation is to create a PCPI, then determining if there is enough allocated space to write the PCPI to the disk,
if there is enough allocated space to write the PCPI, permitting the write operation, and
if there is not enough allocated space to write the PCPI, allocating from the free space to space for the PCPI, and permitting the write operation;
if the write operation is not to create a PCPI, then,
if the write operation will not fill up the allocated space, permitting the write operation,
if the write operation will fill up the allocated space, increasing the allocated space from the free space, and permitting the write operation;
in the event that there is not enough free space to allocate space for the write operation, rejecting the write operation.

17. The file server of claim 16, further comprising:
a processor to execute the write command, in response to the write command writing data to storage blocks allocated to the file system.

18. The file server of claim 16, further comprising:
the processor to execute the write command in response to there being enough free space on the disk to execute the write command.

19. The file server of claim 16, further comprising:
a message indicating that an out of space error occurred.

20. The file server of claim 16, further comprising:
the operating system to write a persistent consistency point in time (PCPI) of the file system in response to the write command.

21. The file server of claim 16, further comprising:
the operating system to determine if there is sufficient space to write a PCPI, and if there is not enough space to write a complete PCPI, denying the write command.

22. The file server of claim 16, further comprising:
the disk used as one disk of a plurality of disks, the plurality of disks forming a Redundant Array of Independent Disks (RAID) system.

23. The file server of claim 16, further comprising:
reserve space maintained on the disk for the file system.

24. The file server of claim 23, further comprising:
the operating system to increase the reserve space on the disk for the file system in response to there not being enough free space to execute the write command.

25. The file server of claim 16, further comprising:
creating the file system as a sparse file system.

26. The file server of claim 25, further comprising:
a reserve space used for filling holes of the sparse file system.

27. The file server of claim 16, further comprising:
the operating system to determine if there is sufficient space to write a PCPI, and if there is not enough space to write a complete PCPI, denying the write command.

28. The file server of claim 16, further comprising:
a threshold measure of free space on the disk; and
the operating system to deny the write command in the event that the write command will fill the disk beyond the threshold.

29. The file server of claim 16, further comprising:
the operating system to calculate the free space by subtracting an amount of used space from a total space available on the disk for the file system.

30. The file server of claim 16, further comprising:
the operating system to account for a concurrent write command to the file system in determining the free space on the disk for the file system.

31. The file server of claim 16, further comprising:
the operating system to account for an intervening file create command in determining the free space on the disk for the file system.

32. A computer readable persistent storage media, comprising:
said computer readable media containing instructions for execution on a processor for a method of writing data by a file server to a disk, the method having the steps of,
requesting the file server to execute a write command to perform a write operation to a file stored on the disk in response to a request issued by a client on a remote computer, the remote computer connected to the file server by a computer network, the file part of a file system, the disk having a space allocated for the file system, and the disk having a free space;
if the write operation is to write the data into a portion of the persistent storage device already allocated to the computer file system but the portion is not used, then permitting the write operation;
if the write operation is to overwrite a block already written to, permitting the write operation;
if the file system is a sparse file system, keeping a reserve space for filling holes in the sparse file system, and if the write operation is to a hole in the sparse file system and there is enough space in the reserve for the write operation, permitting the write operation,
if there is not enough space for the write operation in the reserve, increasing the reserve space from the free space, and permitting the write operation;
determining if the write operation is to produce a Persistent Consistency Point Image in time (PCPI);
if the write operation is to create a PCPI, then determining if there is enough allocated space to write the PCPI to the disk, if there is enough allocated space to write the PCPI, permitting the write operation, and
if there is not enough allocated space to write the PCPI, allocating from the free space to space for the PCPI, and permitting the write operation;
if the write operation is not to create a PCPI, then,
if the write operation will not fill up the allocated space, permitting the write operation,
if the write operation will fill up the allocated space, increasing the allocated space from the free space, and permitting the write operation;
in the event that there is not enough free space to allocate space for the write operation, rejecting the write operation.

* * * * *